Figure 1:
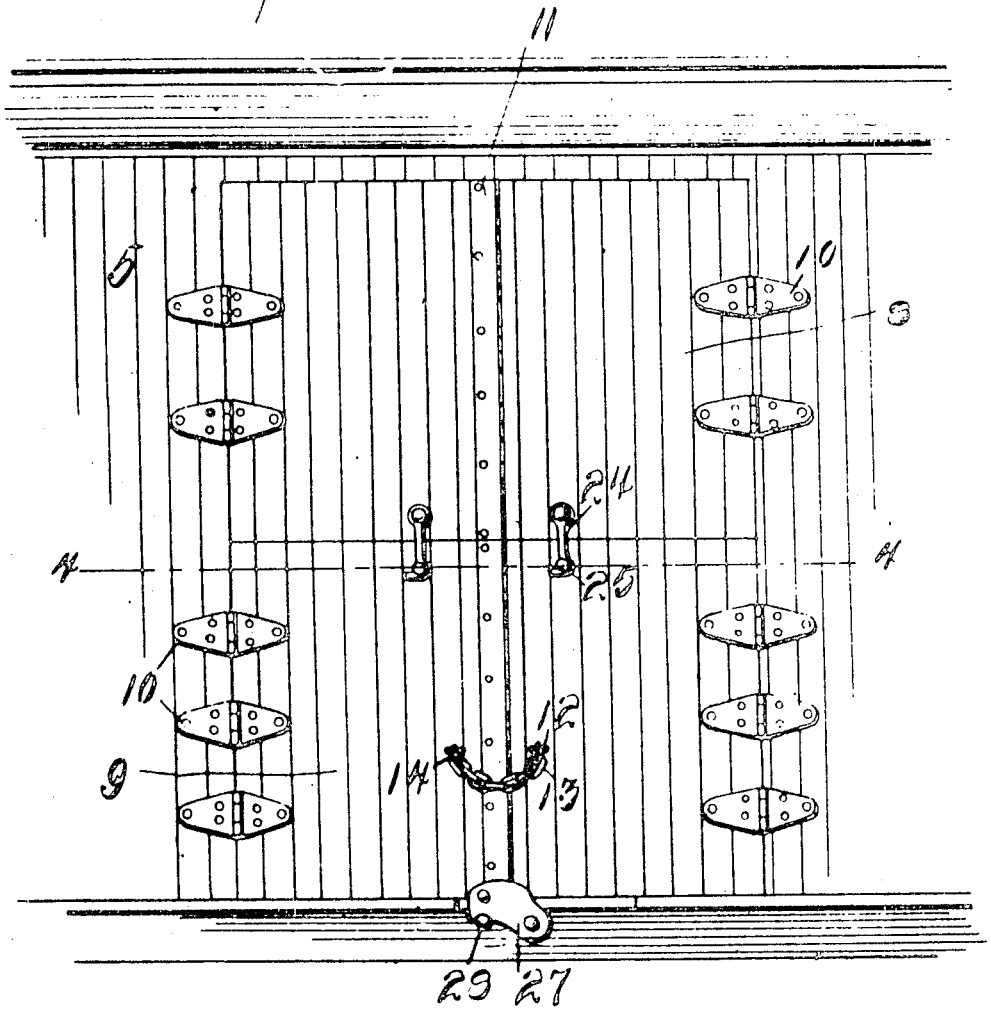

G. A. CARLSON.
CAR DOOR.
APPLICATION FILED OCT. 4, 1909.

956,758.

Patented May 3, 1910
2 SHEETS—SHEET 1.

Witnesses
Gerald Hennessy
A. O. Carlson

Inventor
Gustie A. Carlson
By Chandler & Chandler
Attorneys

G. A. CARLSON.
CAR DOOR.
APPLICATION FILED OCT. 4, 1909.
956,758.
Patented May 3, 1910.
2 SHEETS—SHEET 2.
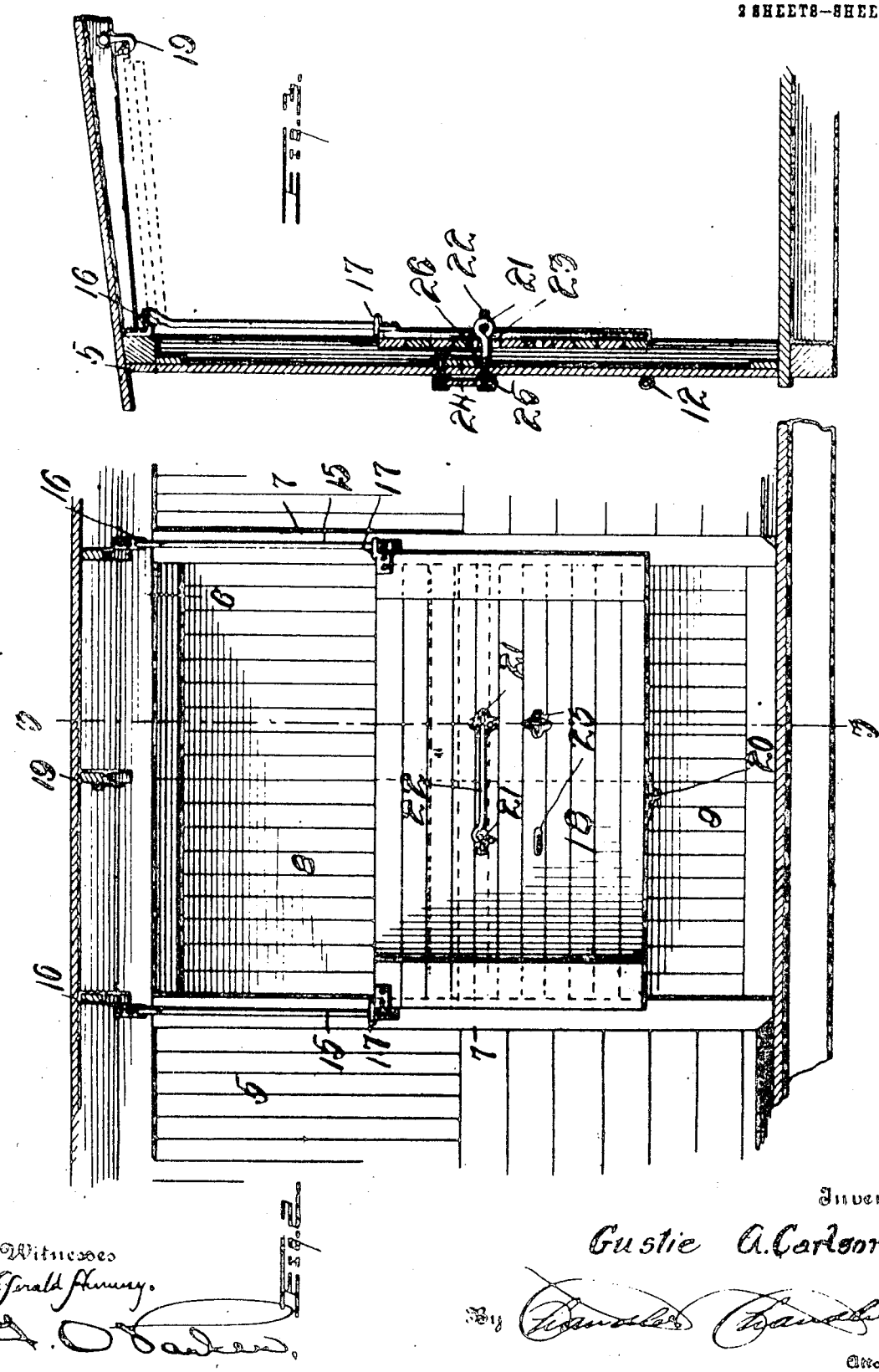
Witnesses
Inventor
Gustie A. Carlson

UNITED STATES PATENT OFFICE.

GUSTIE A. CARLSON, OF BUDA, NEBRASKA.

CAR-DOOR.

956,758.  Specification of Letters Patent.  Patented May 3, 1910.

Application filed October 4, 1909. Serial No. 520,884.

*To all whom it may concern:*

Be it known that I, GUSTIE A. CARLSON, a citizen of the United States, residing at Buda, in the county of Buffalo, State of Nebraska, have invented certain new and useful Improvements in Car-Doors; and I do hereby declare the following to be a full, clear, and exact description of the invention, such as will enable others skilled in the art to which it appertains to make and use the same.

The invention relates to car doors and more particularly to the class of grain car doors.

The primary object of the invention is the provision of a car door in which the sections thereof may be partially opened to permit the discharge of the grain from the car to enable the ready and quick unloading of the same.

Another object of the invention is the provision of a car door in which the door sections are relieved from excessive pressure due to the weight of the grain or the like loaded in the car and when being discharged therefrom.

A further object of the invention is the provision of a car door of this character which is simple in construction, thoroughly reliable, and effectual in its function.

In the drawings accompanying and forming part of this specification is illustrated the preferred form of embodiment of the invention, which to enable those skilled in the art to practice the invention, will be set forth in the following description, while the novelty of the invention will be pointed out in the claims hereunto appended.

Figure 4:
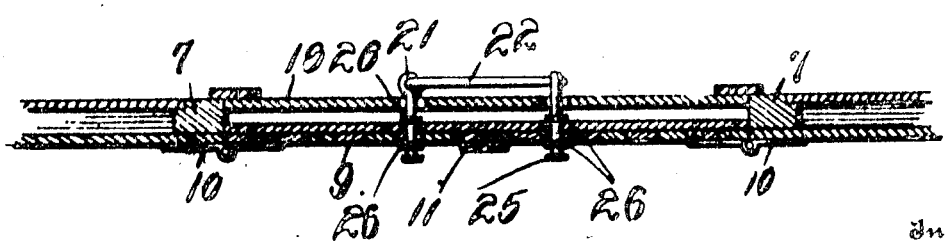

In the drawings: Figure 1 is a fragmentary side elevation of a car with the doors mounted thereon in accordance with the invention. Fig. 2 is a vertical longitudinal sectional view looking toward the inner face of the sides of the car. Fig. 3 is a transverse sectional view on the line 3—3 of Fig. 2, showing in dotted lines the slidable sections swung upwardly against the top of the car. Fig. 4 is a sectional view on the line 4—4 of Fig. 1.

Similar reference characters indicate corresponding parts throughout the several views in the drawings.

Referring to the drawings 5 designates a portion of the vertical side wall to the body of a car adjacent the door opening which latter is formed by the usual door frame 6, having vertical side posts 7, to which latter are connected upper and lower sections 8 and 9 of swinging doors by the usual hinges 10, and these sections are adapted to close the door opening and when in this position to lie substantially flush with the outer surface of the vertical wall 5 of the car. These sections 8 and 9 when in closed position have their meeting edges overlapped by a weather strip or board 11, the same being secured in a suitable manner to one of the upper and lower sections. Mounted in the lower section 9 in alinement with each other are eye members 12, the same projecting outwardly from the sections and one of which has connected thereto a chain 13, carrying a hook 14, which detachably engages the other eye member 12 so as to maintain the lower sections partially opened when discharging grain or like material from the car after having been loaded therewith.

At opposite sides of the door opening and secured to the door frame near its upper end on the inner face thereof are vertical guide rods 15, the latter being bent near their upper ends to form bearing offsets or noses 16, and slidably engaging these rods 15, are retaining loops 17, the same fixed to upper corners of a displaceable boarded section 18, which latter is permitted for vertical sliding movement on the rods 15, and when it is not in use the same will be raised adjacent the roof of the car and held in this position by the retaining loops 17, engaging the bearing offsets or noses 16, and a pivotal hook member 19, engaging a strap handle 20, fixed to the said section, this hook member being pivoted to one of the cross beams supporting the roof of the car.

Mounted in the lower sections 9, of the doors are eye members 21, one of which carries a hook 22, adapted to engage the other eye member and these eye members are adapted to project inwardly from the door sections 9, to engage in suitable openings 23, in the slidable section 18, so that the hook member will lock this slidable section 18, against sliding movement and also the lower sections 9 in closed position.

Pivoted to the upper sections 8 of the swinging doors on the outside thereof are hook members 24, which latter engage stud terminals 25, of the eye members 21, to lock the upper and lower sections 8 and 9 of the swinging doors together. These eye members 21 are rigidly held on the lower sections 9, by jam nuts 26 so as to prevent the same from becoming loose.

Pivoted to the bottom of the door frame is a swinging locking member 27, which is adapted to be swung across the path of movement of the lower sections 9, to engage a stop pin 28, and when in this position will maintain the doors closed.

What is claimed is:—

1. The combination with a door frame, of hinged upper and lower door sections carried by the frame, members mounted transversely in the lower door section and having eye terminals protruding from the inner faces of the latter, and also stud terminals protruding from the outer faces of said lower door sections, a movable section having openings receiving the eye terminals, and means engaging the eye terminals to lock said movable section to the said lower door section, and means on the upper door section engageable with the stud terminals to lock the said upper and lower door sections together.

2. The combination with a door frame, of hinged upper and lower door sections carried by the frame, members mounted transversely in the lower door section and having eye terminals protruding from the inner faces of the latter, also stud terminals protruding from the outer faces of the said lower door section, guide rods mounted on the inner face of the door frame at opposite sides thereof near its upper end, a movable section having connection with the said guide rods, and provided with openings receiving the eye terminals, a hook loosely connected to one eye terminal and adapted to be engaged in the other eye terminal locking the said movable section to the lower door section and also securing the latter door sections together, and hooks pivotally connected to the upper door section and engageable with the stud terminals to lock the said upper and lower door sections together.

In testimony whereof, I affix my signature, in presence of two witnesses.

GUSTIE A. CARLSON.

Witnesses:
B. F. HENLINE,
R. D. GARRISON.